United States Patent
Ke et al.

(10) Patent No.: US 8,964,661 B2
(45) Date of Patent: Feb. 24, 2015

(54) METHOD AND APPARATUS FOR DETERMINING A SLOT FORMAT OF A FRACTIONAL DEDICATED PHYSICAL CONTROL CHANNEL

(75) Inventors: Yazhu Ke, Shenzhen (CN); Xiang Cheng, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 241 days.

(21) Appl. No.: 13/257,934

(22) PCT Filed: Nov. 9, 2009

(86) PCT No.: PCT/CN2009/074870
§ 371 (c)(1),
(2), (4) Date: Apr. 27, 2012

(87) PCT Pub. No.: WO2011/054157
PCT Pub. Date: May 12, 2011

(65) Prior Publication Data
US 2012/0218940 A1 Aug. 30, 2012

(51) Int. Cl.
*H04W 4/00* (2009.01)
*H04W 48/12* (2009.01)
*H04W 24/00* (2009.01)
(Continued)

(52) U.S. Cl.
CPC .............. *H04W 48/12* (2013.01); *H04W 24/00* (2013.01); *H04W 52/58* (2013.01); *H04W 72/00* (2013.01)
USPC ........................................................ 370/329

(58) Field of Classification Search
CPC .......... H04W 52/365; H04W 72/0406; H04W 72/0426

USPC .................... 370/328.329, 345; 455/422.1, 69
See application file for complete search history.

(56) References Cited

U.S. PATENT DOCUMENTS

| | | | |
|---|---|---|---|
| 7,012,906 B1 * | 3/2006 | Song | 370/335 |
| 7,953,140 B2 * | 5/2011 | Catreux et al. | 375/148 |
| 7,961,700 B2 * | 6/2011 | Malladi et al. | 370/345 |

(Continued)

FOREIGN PATENT DOCUMENTS

| | | | |
|---|---|---|---|
| CN | 101426237 A | 5/2009 | |
| CN | 101494905 A | 7/2009 | |

(Continued)

OTHER PUBLICATIONS

International Search Report in international application No. PCT/CN2009/074870, mailed on Aug. 12, 2010.

(Continued)

*Primary Examiner* — Raj Jain
(74) *Attorney, Agent, or Firm* — Oppedahl Patent Law Firm LLC

(57) ABSTRACT

A method for determining a slot format of an F-DPCH is disclosed in the present disclosure, including: a Node B using No.0 slot format of the F-DPCH as the slot format for transmitting information over the F-DPCH when detecting that a UE in CELL_FACH state or idle mode is using an E-DCH. An apparatus for determining a slot format of an F-DPCH is also disclosed. The present disclosure ensures that the slot format of the F-DPCH transmitted by the Node B is identical with that of the F-DPCH received by the UE, so that the UE can correctly receive the TPC bits carried on the F-DPCH, and thus the UE can use the TPC bits to implement inner loop power control. Therefore, the Node B can correctly receive the data information transmitted over an E-DPDCH.

14 Claims, 2 Drawing Sheets

(51) Int. Cl.
*H04W 52/58* (2009.01)
*H04W 72/00* (2009.01)

(56) References Cited

U.S. PATENT DOCUMENTS

| | | | |
|---|---|---|---|
| 2006/0072500 A1* | 4/2006 | Kent et al. | 370/328 |
| 2006/0262840 A1* | 11/2006 | Wang et al. | 375/221 |
| 2009/0168750 A1* | 7/2009 | Pelletier et al. | 370/350 |
| 2009/0238136 A1 | 9/2009 | Sambhwani et al. | |
| 2010/0041389 A1 | 2/2010 | Cave et al. | |
| 2010/0087204 A1* | 4/2010 | Islam et al. | 455/456.1 |
| 2010/0113004 A1* | 5/2010 | Cave et al. | 455/422.1 |
| 2014/0078892 A1 | 3/2014 | Cave et al. | |

FOREIGN PATENT DOCUMENTS

| | | |
|---|---|---|
| KR | 20070118273 A | 12/2007 |
| WO | 2009058764 A1 | 5/2009 |
| WO | 2009116212 A1 | 9/2009 |
| WO | 2009120634 A1 | 10/2009 |

OTHER PUBLICATIONS

English Translation of the Written Opinion of the International Search Authority in international application No. PCT/CN2009/074870, mailed on Aug. 12, 2010.
High Speed Download Packet Access (HSDPA) enhancements Sep. 30, 2004.
Physical channels and mapping of transport channels onto physical channels (FDD) Mar. 31, 2009.
3GPP, ETSI TSI 25 433 V 8.6.0, Universal Mobile Telecommunications System (UMTS); UTRAN Iub interface Node B Application Part (NBAP) signalling (3GPP TS 25.433 version 8.6.0 Release 8), Oct. 2009, 12 total pages.
3rd Generation Partnership Project; Technical Specification Group Radio Access Network; Physical channels and mapping of transport channels onto physical channels (FDD)(Release 7), 3GPP TS25.211 V7.2.0, May 2007, 4 total pages.
3GPP TSG RAN WG1 Meeting #9, Change Request TS25.211 version3.0.0, Removal of superframe notation, Ericsson, Dresden, Nov. 30, 1999-Dec. 3, 1999, 8 total pages.
"Technical Specification Group Radio Access Network; UTRAN Iub interface Node B Application Part (NBAP) signalling (Release 8)", 3GPP Standard; 3GPP TS 25.433, No. V8.6.0, Sep. 1, 2009. (21 pages—see Supplementary European Search Report in European application No. 09851040.7 for relevant pages).
Interdigital: "Clarification of F-DPCH slot format for E-DCH in CELL_FACH", 3GPP Draft; 25331_CRXXXX_(REL-8)_R2-091402, 3RD Generation Partnership Project (3GPP), Mobile Competence Centre; 650, Route Des Lucioles; F-06921 Sophia-Antipolis Cedex; France, no. Athens, Greece; Feb. 3, 2009. (2 pages—see Supplementary European Search Report in European application No. 09851040.7 for relevant pages).
Nokia Corporation et al: "Clarification to the use of F-DPCH slot format" IE, 3GPP Draft; R2-086883 CR3478 25.331 FDPCH Slot Format REL-8, vol. RAN WG2, Nov. 16, 2008. (2 pages—see Supplementary European Search Report in European application No. 09851040.7 for relevant pages).
Supplementary European Search Report in European application No. 09851040.7, mailed on Oct. 9, 2014. (8 pages—see entire document).

* cited by examiner

METHOD AND APPARATUS FOR DETERMINING A SLOT FORMAT OF A FRACTIONAL DEDICATED PHYSICAL CONTROL CHANNEL

TECHNICAL FIELD

The present disclosure relates to technologies for determining the slot format of a Fractional Dedicated Physical Control Channel (F-DPCH), and in particular to a method and apparatus for a Node B in a mobile radio communication system to determine the slot format of an F-DPCH when a User Equipment (UE) is in cell forward access channel (CELL_FACH) state or idle mode.

BACKGROUND

With evolution of mobile communication systems, Quality of Service (QoS) for users has become the primary issue of operators. The QoS affects service performance and determines users' satisfaction with services. One important aspect for improving the QoS is the time delay when setting up connections and allocating channels, and the existence of frequent services of small data packets, therefore, it is necessary to consider making the common channels work more effectively, for example, by reducing the signaling delay in the uplink and downlink. By introducing the downlink High Speed Packet Access (HSPA), 3rd Generation Partnership Project (3GPP) standard has shortened the downlink signaling delay in the CELL_FACH, Cell_Paging_Channel (CELL_PCH), or UTRAN Registration Area_Paging Channel (URA_PCH) state, however, the issue of the uplink signaling delay still exists.

To shorten the uplink signaling delay, the following aspects need to be considered:

(1) reducing the waiting time of the user plane and control plane in the idle mode, CELL_FACH, CELL_PCH, or URA_PCH state;

(2) improving the peak rate in the CELL_FACH state;

(3) shortening the delay in transition between the idle, CELL_FACH, CELL_PCH, URA_PCH, and Cell_Dedicated Channel (CELL_DCH) states.

To achieve the above objective, the 3GPP standard has introduced the Enhanced Dedicated Channel (E-DCH) in the CELL_FACH state and idle mode, that is, the High Speed Uplink Packet Access (HSUPA) can be used in the idle mode or CELL_FACH state. Application of the HUSPA in the idle mode and CELL_FACH state is called the uplink enhanced CELL_FACH technology.

The uplink enhanced CELL_FACH technology follows the principle as follows: random access still adopts the access process of the Physical Random Access Channel (PRACH) but the channel type changes; that is, the E-DCH is used in the idle mode or CELL_FACH state, logical channels such as Common Control Channel (CCCH), Dedicated Control Channel (DCCH), or Dedicated Traffic Channel (DTCH) can be mapped to the E-DCH and then transmitted. The E-DCH is mapped to the E-DCH Dedicated Physical Data Channel (E-DPDCH). The E-DPDCH works basing on the E-DCH Dedicated Physical Control Channel (E-DPCCH). The E-DPCCH is based on the Dedicated Physical Control Channel (DPCCH). Therefore, in the enhanced CELL_FACH state, a DPCCH is required in the uplink, and for collaborating with the uplink DPCCH to perform link synchronization, a Fractional Dedicated Physical Control Channel (F-DPCH) is also required in the downlink.

According to the current 3GPP, Uu interface defines that No.0 slot format is used by the F-DPCH used by the UE in the idle mode and CELL_FACH state, so it is needless for the radio network controller (RNC) to notify the Node B of the slot format through signaling. However, on the Iub interface, there is a configuration cell for configuring the F-DPCH slot format used in the idle mode or CELL_FACH state, and there are 10 types of slot formats that can be configured for the F-DPCH, and the Iub interface protocol does not define that the Node B can only use No.0 slot format.

FIG. 1 is a schematic diagram of E-DPCH frame formats defined in the 3GPP protocol. Referring to FIG. 1, among the defined frame formats, $N_{off1}$ bits and $N_{off2}$ bits are non-transmission bits. The slot formats defined in the 3GPP protocols for the F-DPCH are as shown in Table 1.

TABLE 1

| Slot Format #i | Channel Bit Rate (kbps) | Channel Symbol Rate (ksps) | F | Bits/Slot | $N_{OFF1}$ Bits/Slot | $N_{TPC}$ Bits/Slot | $N_{OFF2}$ Bits/Slot |
|---|---|---|---|---|---|---|---|
| 0 | 3 | 1.5 | 256 | 20 | 2 | 2 | 16 |
| 1 | 3 | 1.5 | 256 | 20 | 4 | 2 | 14 |
| 2 | 3 | 1.5 | 256 | 20 | 6 | 2 | 12 |
| 3 | 3 | 1.5 | 256 | 20 | 8 | 2 | 10 |
| 4 | 3 | 1.5 | 256 | 20 | 10 | 2 | 8 |
| 5 | 3 | 1.5 | 256 | 20 | 12 | 2 | 6 |
| 6 | 3 | 1.5 | 256 | 20 | 14 | 2 | 4 |
| 7 | 3 | 1.5 | 256 | 20 | 16 | 2 | 2 |
| 8 | 3 | 1.5 | 256 | 20 | 18 | 2 | 0 |
| 9 | 3 | 1.5 | 256 | 20 | 0 | 2 | 18 |

It can be see from the frame formats and the slot formats shown in Table 1, No.0 slot format differs from other formats in that the locations the Transmit Power Control (TPC) bits in a slot are different. Consequently, if the RNC configures a non-No.0 slot format for the F-DPCH, the Node B uses the non-No.0 slot format configured by the RNC to transmit the F-DPCH, but the UE fixedly uses No.0 slot format to receive the F-DPCH. As a result, the UE cannot correctly receive the TPC bits information and thus it cannot perform inner loop power control properly, thereby causing link failure.

SUMMARY

Accordingly, the present disclosure is directed to providing a method and apparatus for determining the slot format of an F-DPCH to enable a UE correctly receive TPC bits carried on the F-DPCH and use the TPC bits to implement inner loop power control so that the Node B can correctly receive the data information transmitted over an E-DPDCH.

In view of the above objective, technical solutions of the disclosure are provided as follows.

In one aspect, a method for determining the slot format of a Fractional Dedicated Physical Control Channel (F-DPCH) is provided, which includes:

a Node B using No.0 slot format of the F-DPCH as a slot format for sending messages over the F-DPCH when detecting that a UE in CELL_FACH state or idle mode is using an E-DCH.

Preferably, the method further includes a step, preceding the step of detecting that a UE in CELL_FACH state or idle mode is using an E-DCH, of the Node B receiving configuration information about a common E-DCH from an RNC over signaling, where the common E-DCH configuration information contains configuration information about the slot format of the F-DPCH, or the common E-DCH configuration information contains no configuration information about the slot format of the F-DPCH.

Preferably, the signaling is a Physical Shared Channel (PSCH) reconfiguration request message.

Preferably, the common E-DCH configuration information is contained in the common E-DCH system information contained in the PSCH reconfiguration request message.

An apparatus for determining a slot format of an F-DPCH includes a detecting unit and a determining unit.

The detecting unit is configured to detect whether a UE in CELL-FACH state or idle mode is using an E-DCH, and further trigger the determining unit if the UE is using the E-DCH.

The determining unit is configured to use No.0 slot format of the F-DPCH as the slot format for transmitting information over the F-DPCH.

Preferably, the apparatus further includes a receiving unit configured to receive configuration information about a common E-DCH from an RNC over signaling, where the configuration information about the common E-DCH contains configuration information about the slot format of the F-DPCH, or the configuration information about the common E-DCH contains no configuration information about the slot format of the F-DPCH.

Preferably, the signaling is a PSCH reconfiguration request message.

Preferably, the configuration information about the common E-DCH is contained in the common E-DCH system information contained in the PSCH reconfiguration request message.

According to the present disclosure, when determining that a UE is currently in the idle mode or/and CELL_FACH state, the Node B uses No.0 slot format of the F-DPCH as the slot format for transmitting information over the F-DPCH instead of using the F-DPCH slot format notified by the RNC, regardless of whether the Node B have received the configuration information about the slot format of the F-DPCH from the RNC. This ensures that the slot format of the F-DPCH transmitted by the Node B is identical with that of the F-DPCH received by the UE, so that the UE can correctly receive the TPC bits carried on the F-DPCH, and thus the UE can use the TPC bits to implement inner loop power control. Therefore, the Node B can correctly receive the data information transmitted over an E-DPDCH.

DETAILED DESCRIPTION

The disclosure is described below in conjunction with the accompanying drawings and embodiments.

Embodiment 1

Figure 1:
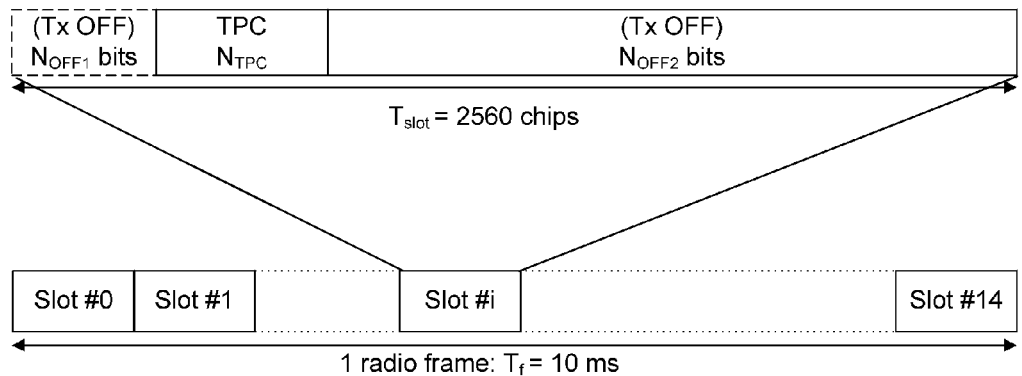
FIG. 1 is a schematic diagram of F-DPCH frame formats defined in the 3GPP protocols.
Figure 2:
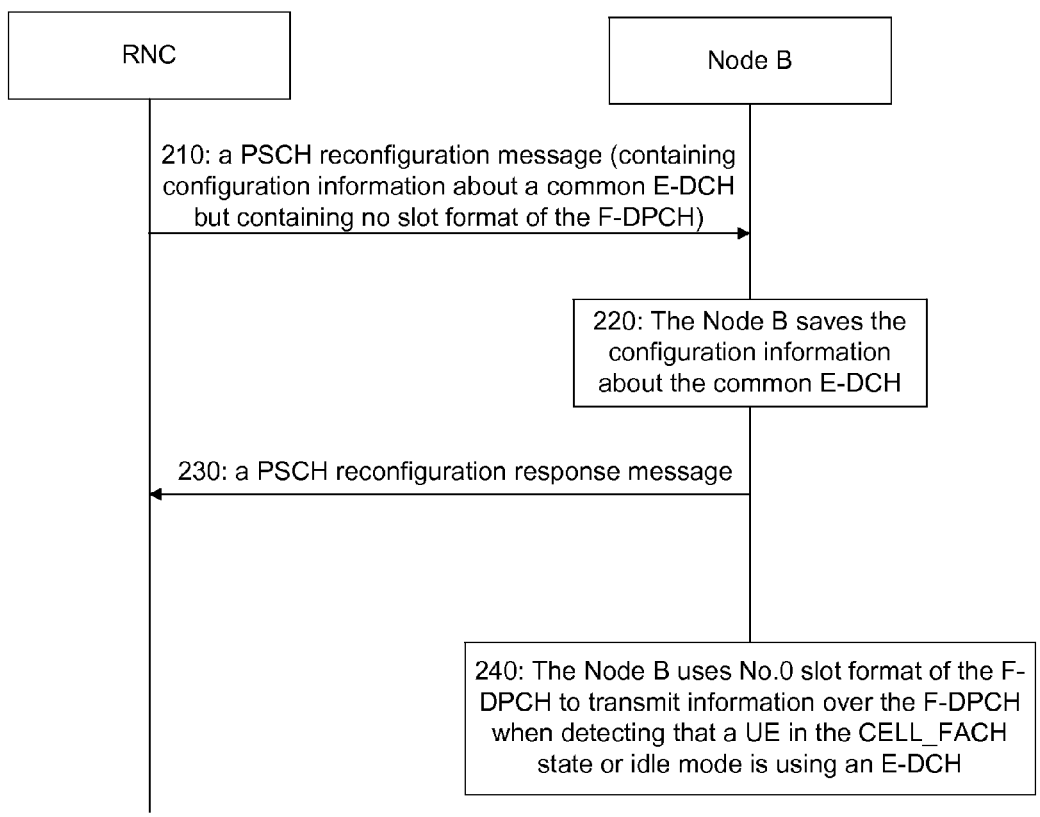
FIG. 2 is a flowchart of a method for determining the slot format of an F-DPCH according to one embodiment of the present disclosure.

FIG. 2 is a flowchart of a method for determining the slot format of an F-DPCH according to one embodiment of the present disclosure. Referring to FIG. 2, the method for a Node B to determine the slot format of the F-DPCH when a UE is in CELL_FACH state or idle mode specifically includes the following steps:

Step 210: An RNC notifies the Node B of configuration information about a common E-DCH through a PSCH reconfiguration message, where the configuration information about the common E-DCH does not contain the configuration information about the slot format of the F-DPCH. The PSCH reconfiguration message is a PSCH reconfiguration request message.

Step 220: The Node B saves the E-DCH configuration information notified through the PSCH reconfiguration message.

Step 230: The Node B returns a PSCH reconfiguration response message to the RNC.

Step 240: The Node B uses No.0 slot format of the F-DPCH to transmit information over the F-DPCH when detecting that a UE in the CELL_FACH state or idle mode is using an E-DCH.

Embodiment 2

Figure 3:
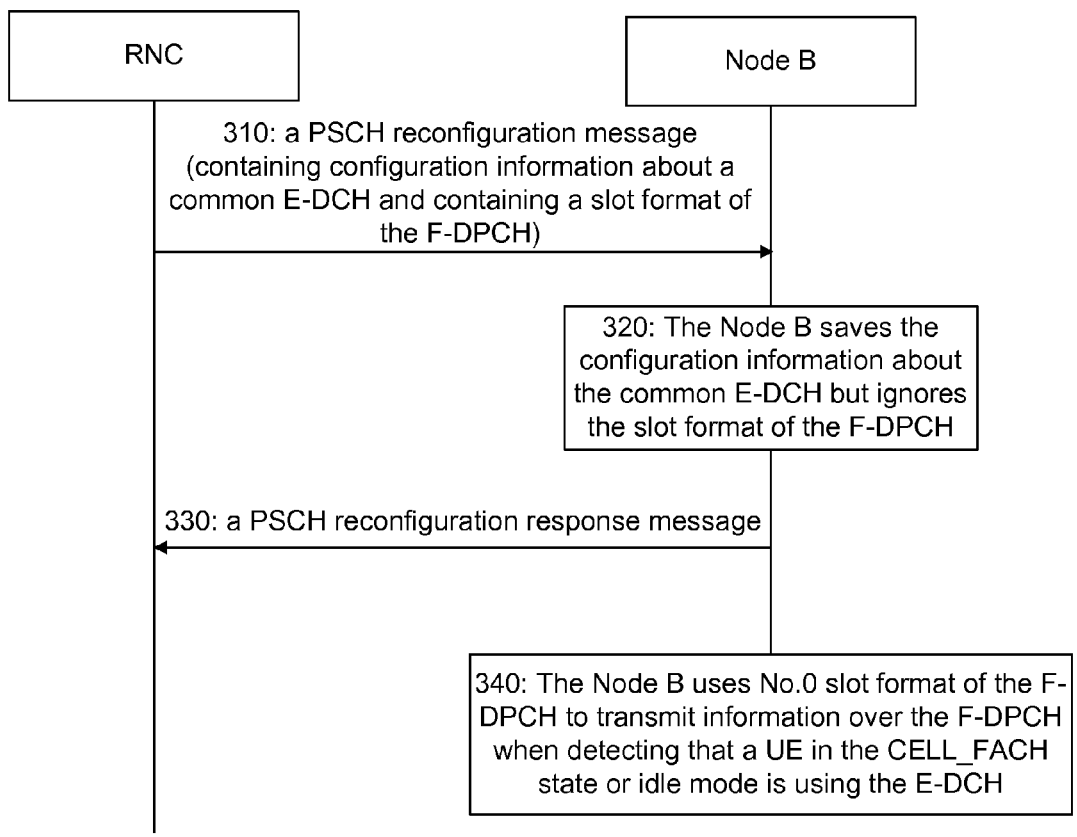
FIG. 3 is a flowchart of a method for determining the slot format of an F-DPCH according to another embodiment of the present disclosure.

FIG. 3 is a flowchart of a method for determining the slot format of an F-DPCH according to another embodiment of the present disclosure. Referring to FIG. 3, the method for a Node B to determine the slot format of the F-DPCH when a UE is in CELL_FACH state or idle mode specifically includes the following steps:

Step 310: An RNC notifies the Node B of configuration information about a common E-DCH through a PSCH reconfiguration message, where the configuration information about the common E-DCH contains the configuration information about the slot format of the F-DPCH. The PSCH reconfiguration message is a PSCH reconfiguration request message.

Step 320: The Node B saves the E-DCH configuration information notified through the PSCH reconfiguration message, but ignores the configured slot format of the F-DPCH.

Step 330: The Node B returns a PSCH reconfiguration response message to an RNC.

Step 340: The Node B uses No.0 slot format of the F-DPCH to transmit information over the F-DPCH when detecting that a UE in CELL_FACH state or idle mode is using the E-DCH.

Figure 4:
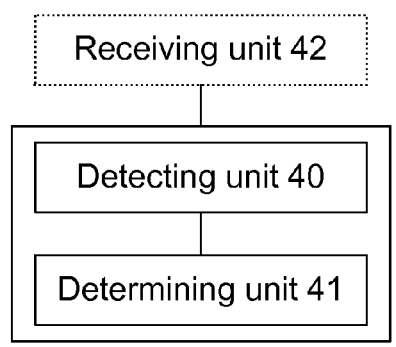
FIG. 4 is a schematic structure diagram of an apparatus for determining the slot format of an F-DPCH according to the present disclosure.

FIG. 4 is a schematic structure diagram of an apparatus for determining the slot format of an F-DPCH according to the present disclosure. Referring to FIG. 4, the apparatus includes a detecting unit 40 and a determining unit 41, wherein, the detecting unit 40 is configured to detect whether a UE in CELL_FACH state or idle mode is using an E-DCH, and further trigger the determining unit 41 if the UE is using the E-DCH.

the determining unit is configured to use No.0 slot format of the F-DPCH as the slot format for sending messages over the F-DPCH.

For further optimizing the technical solution of the present disclosure, referring to FIG. 4, the apparatus further includes:

a receiving unit 42, configured to receive configuration information about a common E-DCH from an RNC over signaling, where the configuration information about the common E-DCH contains configuration information about the slot format of the F-DPCH, or the configuration information about the common E-DCH contains no configuration information about the slot format of the F-DPCH. The signaling contains a PSCH reconfiguration request message. The configuration information about the common E-DCH is contained in the common E-DCH system information contained in the PSCH reconfiguration request message.

A person skilled in the art should understand that, the apparatus illustrated in FIG. 4 is designed for the method for determining the slot format of the F-DPCH, and functions of units and elements contained in the apparatus can be understood by referring to description of Embodiments 1 and 2, and can be implemented either by programs running in the processor or specific logic circuits.

The above are only preferred embodiments of the present disclosure, and not intended to limit the protection scope of the present disclosure.

The invention claimed is:

1. A method for determining a slot format of a Fractional Dedicated Physical Control Channel (F-DPCH), comprising:
    receiving, by a Node B, configuration information about a common Enhanced Dedicated Channel (E-DCH) from a Radio Network Controller (RNC) over signaling;
    detecting, by the Node B, whether a User Equipment (UE) in Cell Forward Access Channel (CELL_FACH) state or idle mode is using an Enhanced Dedicated Channel (E-DCH); and
    using, by the Node B, number zero slot format of the F-DPCH as a slot format for transmitting information over the F-DPCH when detecting that the UE in CELL FACH state or idle mode is using an E-DCH.

2. The method according to claim 1,
    wherein the configuration information about the common E-DCH contains configuration information about the slot format of the F-DPCH.

3. The method according to claim 1,
    wherein the configuration information about the common E-DCH contains no configuration information about the slot format of the F-DPCH.

4. The method according to claim 2, wherein the signaling is a Physical Shared Channel (PSCH) reconfiguration request message.

5. The method according to claim 4, wherein the PSCH reconfiguration request message contains common E-DCH system information, and the configuration information about the common E-DCH is configured in the common E-DCH system information.

6. An apparatus for determining a slot format of a Fractional Dedicated Physical Control Channel (F-DPCH), comprising:
    a receiving unit configured to receive configuration information about a common Enhanced Dedicated Channel (E-DCH) from a Radio Network Controller (RNC) over signaling;
    a detecting unit configured to detect whether a User Equipment (UE) in Cell Forward Access Channel (CELL-FACH) state or idle mode is using an Enhanced Dedicated Channel (E-DCH), and to trigger the determining unit if the UE is using the E-DCH; and
    a determining unit configured to use number zero slot format of the F-DPCH as a slot format for transmitting information over the F-DPCH.

7. The apparatus according to claim 6,
    wherein the configuration information about the common E-DCH contains configuration information about the slot format of the F-DPCH.

8. The apparatus according to claim 6,
    wherein the configuration information about the common E-DCH contains no configuration information about the slot format of the F-DPCH.

9. The apparatus according to claim 7, wherein the signaling is a Physical Shared Channel (PSCH) reconfiguration request message.

10. The apparatus according to claim 9, wherein the PSCH reconfiguration request message contains common E-DCH system information, and the configuration information about the common E-DCH is configured in the common E-DCH system information.

11. The method according to claim 3, wherein the signaling is a Physical Shared Channel (PSCH) reconfiguration request message.

12. The method according to claim 11, wherein the PSCH reconfiguration request message contains common E-DCH system information, and the configuration information about the common E-DCH is configured in the common E-DCH system information.

13. The apparatus according to claim 8, wherein the signaling is a Physical Shared Channel (PSCH) reconfiguration request message.

14. The apparatus according to claim 13, wherein the PSCH reconfiguration request message contains common E-DCH system information, and the configuration information about the common E-DCH is contained configured in the common E-DCH system information.

* * * * *